(12) United States Patent
Yamada

(10) Patent No.: US 7,655,057 B2
(45) Date of Patent: Feb. 2, 2010

(54) POLISHING COMPOSITION AND POLISHING METHOD

(75) Inventor: Eiichi Yamada, Kani (JP)

(73) Assignee: Fujimi Incorporated, Kiyosu-shi, Aichi (JP)

( * ) Notice: Subject to any disclaimer, the term of this patent is extended or adjusted under 35 U.S.C. 154(b) by 622 days.

(21) Appl. No.: 11/512,997

(22) Filed: Aug. 30, 2006

(65) Prior Publication Data

US 2007/0044385 A1 Mar. 1, 2007

(30) Foreign Application Priority Data

Aug. 31, 2005 (JP) ............... 2005-252638
Aug. 31, 2005 (JP) ............... 2005-252639
Aug. 31, 2005 (JP) ............... 2005-252640

(51) Int. Cl.
*C09K 3/14* (2006.01)
*B24D 3/02* (2006.01)
*C09C 1/68* (2006.01)

(52) U.S. Cl. .................. 51/298; 51/307; 51/308; 51/309

(58) Field of Classification Search ............ 51/298, 51/307–309
See application file for complete search history.

(56) References Cited

U.S. PATENT DOCUMENTS 4,225,349 A 9/1980 Koshiyama et al. ............ 106/3
4,935,039 A 6/1990 Miyazaki et al. ............... 51/309
4,956,015 A 9/1990 Okajima et al. ................ 106/3
2004/0187393 A1 9/2004 Mutoh et al. ................... 51/309

FOREIGN PATENT DOCUMENTS

JP 7-11239 1/1995
JP 2004-300347 10/2004

*Primary Examiner*—Jerry Lorengo
*Assistant Examiner*—Joseph V Micali
(74) *Attorney, Agent, or Firm*—Vidas, Arrett & Steinkraus

(57) ABSTRACT

A polishing composition contains a compound represented by the general formula (1) below and abrasive grains. In the general formula (1), X represents a residue of polyether polyol (having a polyether chain containing an oxyethylene group in an amount of 20 to 90% by mass) derived from a compound having an active hydrogen atom and an alkylene oxide; m represents an integer of 2 to 8, which is equal to the number of hydroxy groups contained in a single polyether polyol molecule; Y and Z represent a lower alcohol residue to which ethylene oxide or propylene oxide is added by addition polymerization, an alkyl group or an alkylene group, respectively; and n is an integer of 3 or more.

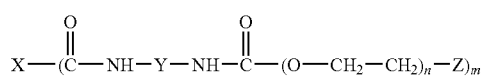

(1)

21 Claims, No Drawings

POLISHING COMPOSITION AND POLISHING METHOD

BACKGROUND OF THE INVENTION

The present invention relates to a polishing composition for use in polishing an object formed of a synthetic resin such as a plastic lens and a polishing method using the polishing composition.

Japanese Laid-Open Patent Publication No. 2004-300347 discloses a polishing composition containing alumina, poly(oxyethylene-oxypropylene)glyceryl ether, aluminum nitrate, and water, for use in polishing an object formed of a synthetic resin. However, the polishing composition has a problem in that it has a high biological oxygen demand (BOD) and chemical oxygen demand (COD), requiring time and labor for treating wastewater.

SUMMARY OF THE INVENTION

In the circumstances, an objective of the present invention is to provide a polishing composition more suitably used in polishing an object formed of a synthetic resin and a polishing method using the polishing composition.

To achieve the foregoing and other objectives and in accordance with one aspect of the present invention, a polishing composition for use in polishing an object formed of a synthetic resin is provided. The composition includes a compound represented by the following general formula (1) and abrasive grains.

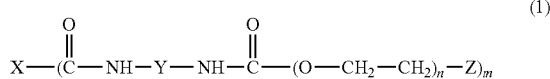

(1)

X represents a residue of polyether polyol (having a polyether chain containing an oxyethylene group in an amount of 20 to 90% by mass) derived from a compound having an active hydrogen atom and an alkylene oxide. m represents an integer of 2 to 8, which is equal to the number of hydroxy groups contained in a single polyether polyol molecule. Y and Z represent a lower alcohol residue to which ethylene oxide or propylene oxide is added by addition polymerization, an alkyl group or an alkylene group, respectively. n is an integer of 3 or more.

In accordance with a second aspect of the present invention, a polishing composition for use in polishing an object formed of a synthetic resin is provided. The composition has a compound represented by the general formula (1) above, and a pH of 3 to 8.

In accordance with a third aspect of the present invention, a polishing composition for use in polishing an object formed of a synthetic resin is provided. The composition has a compound represented by the general formula (1) above, and a viscosity of 3 to 9 mPas.

In accordance with a fourth aspect of the present invention, a method of polishing an object formed of a synthetic resin by use of any of the above polishing compositions.

Other aspects and advantages of the invention will become apparent from the following description, illustrating by way of example the principles of the invention.

DETAILED DESCRIPTION OF THE PREFERRED EMBODIMENTS

A first embodiment of the present invention will be explained below.

A polishing composition according to the first embodiment, which is produced by blending a compound A and abrasive grains in water, substantially consists of the compound A, abrasive grains, and water. The polishing composition is used for polishing an object formed of a synthetic resin such as plastic lens.

The compound A contained in the polishing composition of the first embodiment is a polyurethane surfactant represented by the general formula (1) below. The compound A has a function of suppressing polishing waste and pad waste from adhering to abrasive grains and an object to be polished, thereby improving the performance of a polishing composition according to the first embodiment for polishing the object.

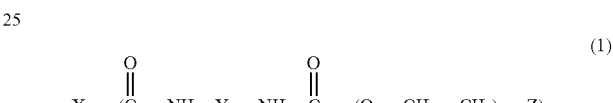

(1)

In the general formula (1), X represents a residue of polyether polyol (having a polyether chain containing an oxyethylene group in an amount of 20 to 90% by mass) derived from a compound having an active hydrogen atom and an alkylene oxide; m represents an integer of 2 to 8, which is equal to the number of hydroxy groups contained in a single polyether polyol molecule; Y and Z represent a lower alcohol residue to which ethylene oxide or propylene oxide is added by addition polymerization, an alkyl group or an alkylene group, respectively; and n is an integer of 3 or more.

As examples of the compound A, mention may be made of compounds of BERMODOL PUR series manufactured by AKZO NOBEL; compounds of Adecanol UH series manufactured by Asahi Denka Kogyo KK; and compounds of Primal series manufactured by Rohm and Haas.

When the content of the compound A in a polishing composition according to the first embodiment is smaller than 0.005% by mass, and more specifically, smaller than 0.02% by mass, the performance of the polishing composition for polishing an object formed of a synthetic resin is not so greatly improved. Accordingly, to obtain a higher removal rate, the content of the compound A in a polishing composition according to the first embodiment is preferably not less than 0.005% by mass, and more preferably, not less than 0.02% by mass. On the other hand, when the content of the compound A in a polishing composition according to the first embodiment is larger than 10% by mass, and more specifically, larger than 3% by mass, the BOD and COD of the polishing composition increase, requiring time and labor for treating polishing wastewater. In view of BOD and COD, the content of the compound A in a polishing composition according to the first embodiment is preferably not more than 10% by mass, and more preferably, not more than 3% by mass.

When the average molecular weight of the compound A contained in a polishing composition according to the first embodiment 1 is smaller than 2,000, and more specifically, smaller than 5,000, the performance of the polishing composition for polishing an object formed of a synthetic resin is not so greatly improved. Accordingly, to obtain a higher removal rate, the average molecular weight of the compound A contained in a polishing composition according to the first embodiment is preferably 2,000 or more, and more preferably, 5,000 or more. On the other hand, when the average molecular weight of the compound A contained in a polishing composition according to the first embodiment is more than 50,000, and more specifically, more than 20,000, the polishing composition may be easily foamed up. Accordingly, the average molecular weight of the compound A contained in a polishing composition according to the first embodiment is preferably 50,000 or less, and more preferably, 20,000 or less.

The abrasive grains have a mechanical polishing function and play a role of improving the performance of a polishing composition according to the first embodiment in polishing an object formed of a synthetic rein. As the abrasive grains to be contained in a polishing composition according to the first embodiment, mention may be made of alumina grains such as α-alumina, δ-alumina, θ-alumina, κ-alumina, and an amorphous alumina grains, and abrasive grains formed of a substance other than alumina such as silica, zirconia, ceria, and titania. However, to obtain a higher removal rate, alumina grains are preferable. Among the alumina grains, α-alumina grains are more preferable.

When the content of abrasive grains in a polishing composition according to the first embodiment is smaller than 3% by mass, more specifically, smaller than 5% by mass, and most specifically, smaller than 10% by mass, the performance of the polishing composition polishing an object formed of a synthetic resin is not so greatly improved. Accordingly, to obtain a higher removal rate, the content of abrasive grains in a polishing composition according to the first embodiment is preferably not less than 3% by mass, more preferably, not less than 5% by mass, and most preferably, not less than 10% by mass. On the other hand, when the content of abrasive grains in a polishing composition according to the first embodiment is larger than 30% by mass, more specifically, larger than 25% by mass, and most specifically, larger than 20% by mass, the viscosity of the polishing composition increases, increasing the amount of the polishing composition, which adheres to the polished object and taken away from the polishing system. This phenomenon is economically unfavorable. In view of economy, the content of abrasive grains in a polishing composition according to the first embodiment is preferably not more than 30% by mass, more preferably, not more than 25% by mass, and most preferably, not more than 20% by mass.

The abrasive grains having an average grain size smaller than 0.015 μm do not exhibit excellent performance in polishing an object formed of a synthetic resin. Accordingly, to obtain a higher removal rate, the average size of the abrasive grains contained in a polishing composition according to the first embodiment is preferably 0.015 μm or more. On the other hand, when the average size of the abrasive grains contained in a polishing composition according to the first embodiment is larger than 12 μm, surface roughness increases or scratch generates, possibly decreasing the surface quality of the polished object. Accordingly, to maintain the surface quality of the polished object, the average size of the abrasive grains contained in a polishing composition according to the first embodiment is preferably 12 μm or less.

Alumina grains having an average grain size smaller than 0.5 μm, more specifically, smaller than 0.6 μm, and most specifically, smaller than 0.7 μm do not exhibit high performance in polishing an object formed of a synthetic resin. Accordingly, when a polishing composition according to the first embodiment contains alumina grains, to obtain a higher removal rate, the average size of alumina grains is preferably 0.5 μm or more, more preferably, 0.6 μm or more, and most preferably, 0.7 μm or more. On the other hand, when the average size of alumina grains contained in a polishing composition according to the first embodiment is larger than 8 μm, more specifically, larger than 4 μm, and most specifically, larger than 2 μm, surface roughness increases or scratch generates, possibly decreasing the surface quality of the polished object. Accordingly, to maintain the surface quality of the polished object, the average size of the alumina grains contained in a polishing composition according to the first embodiment is preferably 8 μm or less, more preferably, 4 μm or less, and most preferably, 2 μm or less.

According to the first embodiment, the following advantages are obtained.

The compound A represented by the general formula (1) has a function of suppressing polishing waste and pad waste from adhering to abrasive grains and an object to be polished. Therefore, a polishing composition according to the first embodiment containing the compound A can polish an object formed of a synthetic resin at a high removal rate without being prevented by the polishing waste and pad waste adhered to the abrasive grains and the object. The reason why the compound A suppresses the adhesion of polishing waste and pad waste to the abrasive grains and the object is conceivably that the compound A acts on the surface of the polishing waste and pad waste, thereby improving the dispersibility of them.

The compound A works more effectively in improving the performance of the polishing composition for polishing an object formed of a synthetic resin compared to a compound B such as poly(oxyethylene-oxypropylene)glyceryl ether (described later). This is because the compound B increases the viscosity of the polishing composition appropriately, thereby improving the polishing performance of a polishing composition. In contrast, the compound A suppresses the adhesion of polishing waste and pad waste to abrasive grains and the object to be polished, thereby improving the polishing performance of a polishing composition. The difference of the compounds A and B in polishing performance is conceivably due to their functional mechanisms. For this reason, even if the content of the compound A in a polishing composition according to the first embodiment is relatively small, the polishing composition is capable of polishing the object formed of a synthetic resin at a high removal rate. Hence, according to the first embodiment, it is possible to provide a polishing composition having a low BOD and COD compared to a conventional polishing composition containing poly(oxyethylene-oxypropylene)glyceryl ether and giving wastewater easily treated.

A second embodiment of the present invention will be explained below.

A polishing composition according to the second embodiment, which is produced by blending the compound A, the compound B and abrasive grains in water, substantially consists of the compounds A and B, abrasive grains, and water. That is, a polishing composition according to the second embodiment differs from that of the first embodiment in the content of the compound B. The polishing composition of the second embodiment is also used in polishing an object formed of a synthetic resin such as a plastic lens.

The compound B, which is contained in a polishing composition according to the second embodiment for further improving a removal rate, may be a compound obtained by reacting a polyalkylene oxide with a methane hydrocarbon, glycerin, 1,2,3-trimethoxypropane, diethyl ether, or methyl acetate, or may be a polyalkylene oxide such as propylene glycol. The polyalkylene oxide can mediate a dealkylation reaction or a dealcohol reaction with a methane hydrocarbon, glycerin, 1,2,3-trimethoxypropane, diethyl ether, and methyl acetate. Examples of the compound obtained by reacting a polyalkylene oxide with a methane hydrocarbon or the like include poly(oxyethylene-oxypropylene) glyceryl ether and a polyoxyalkylene monobutyl ether.

As the polyalkylene oxide to be reacted with a methane hydrocarbon or the like, mention preferably made of polyethylene oxide, polypropylene oxide, or a copolymer of ethylene oxide with propylene oxide. When these polyalkylene oxides are used, unlike the cases where other polyalkylene oxides are used, viscosity of a polishing composition may not excessively increase.

As the compound to be reacted with a polyalkylene oxide, mention may be made of a methane hydrocarbon, glycerin, 1,2,3-trimethoxypropane, diethyl ether, and methyl acetate. Of them, glycerin is preferable. When glycerin is used, unlike the cases where other compounds are used, the viscosity of a polishing composition may not excessively increase.

When the content of the compound B in a polishing composition according to the second embodiment is smaller than 1% by mass, and more specifically, smaller than 3% by mass, the removal rate is not so greatly improved. Accordingly, to obtain a higher removal rate, the content of the compound B in a polishing composition according to the second embodiment is preferably not less than 1% by mass, and more preferably, not less than 3% by mass. On the other hand, when the content of the compound B in a polishing composition according to the second embodiment is larger than 30%, and more specifically, larger than 20% by mass, the viscosity of the polishing composition increases, increasing the amount of the polishing composition, which adheres to the polished object and taken away from the polishing system. This phenomenon is economically unfavorable. In view of economy, the content of the compound B in a polishing composition according to the second embodiment is preferably not more than 30% by mass, and more preferably, not more than 20% by mass.

When the average molecular weight of the compound B in a polishing composition according to the second embodiment is smaller than 50, the removal rate is not so greatly improved. Accordingly, to obtain a higher removal rate, the average molecular weight of the compound B in a polishing composition according to the second embodiment is preferably 50 or more. On the other hand, the average molecular weight of the compound B contained in a polishing composition is larger than 10,000, and more specifically, larger than 5,000, the viscosity of the polishing composition increases, increasing the amount of the polishing composition, which adheres to the polished object and taken away from the polishing system. This phenomenon is economically unfavorable. In view of economy, the average molecular weight of the compound B contained in a polishing composition according to the second embodiment is preferably not more than 10,000, and more preferably, not more than 5,000.

According to the second embodiment, the following advantages are obtained.

A polishing composition according to the second embodiment is capable of polishing an object formed of a synthetic resin at a high removal rate. This is conceivably because the compound A suppresses polishing waste and pad waste from adhering to abrasive grains and the object, and in addition, the compound B appropriately increases the viscosity of the polishing composition, with the result that dispersibility of the abrasive grains contained in the polishing composition is improved; at the same time, the amount of abrasive grains that are held by a polishing pad during polishing increases.

A polishing composition according to the second embodiment contains the compound A, which improves the performance of the polishing composition polishing an object formed of a synthetic resin by suppressing polishing waste and pad waste from adhering to abrasive grains and the object formed of a synthetic resin. For this reason, even if the content of the compound B is relatively small, the composition is capable of polishing the object formed of a synthetic resin at a high removal rate. Hence, according to this embodiment, it is possible to provide a polishing composition which has a lower BOD and COD than a conventional polishing composition and whose wastewater is thereby easily treated.

A third embodiment of the present invention will be explained below.

A polishing composition according to the third embodiment, which is produced by blending the compound A, a compound C and abrasive grains in water, substantially consists of the compounds A and C, abrasive grains, and water. That is, a polishing composition according to the third embodiment differs from that of the first embodiment in the content of the compound C. The polishing composition of the third embodiment is also used in polishing an object formed of a synthetic resin such as a plastic lens.

The compound C, which is contained in a polishing composition according to the third embodiment for further improving a removal rate, may be a metal salt of an inorganic acid, a metal salt of an organic acid, an ammonium salt of an inorganic acid, and an ammonium salt of an organic acid. The inorganic acid may be any one of nitric acid, sulfuric acid, and hydrochloric acid. The organic acid may be any one of oxalic acid, lactic acid, acetic acid, formic acid, citric acid, tartaric acid, malic acid, gluconic acid, glycolic acid, and malonic acid. The metal salt may be any one of an aluminum salt, nickel salt, lithium salt, magnesium salt, sodium salt, and potassium salt. In view of chemical polishing ability, the compound C is preferably an aluminum salt of nitric acid, sulfuric acid, hydrochloric acid, or lactic acid, and more preferably, aluminum nitrate.

When the content of the compound C in a polishing composition according to the third embodiment is smaller than 0.5% by mass, more specifically, smaller than 1% by mass, and most specifically, smaller than 3% by mass, the removal rate is not so greatly improved. Accordingly, to obtain a higher removal rate, the content of the compound C in a polishing composition according to the third embodiment is preferably not less than 0.5% by mass, more preferably, not less than 1% by mass, and most preferably not less than 3% by mass. On the other hand, when the content of the compound C in a polishing composition according to the third embodiment is larger than 20% by mass, more specifically, larger than 15% by mass, and most specifically, larger than 8% by mass, the pH of the polishing composition decreases, with the result that a polishing machine may be easily eroded. In view of preventing the erosion of a polishing machine, the content of the compound C in a polishing composition according to the third embodiment is preferably not more than 20% by mass, more preferably, not more than 15% by mass, and most preferably, not more than 8% by mass.

According to the third embodiment, the following advantages can be obtained.

A polishing composition according to the third embodiment is capable of polishing an object formed of a synthetic resin at a high removal rate. This is conceivably not only because the compound A suppresses polishing waste and pad waste from adhering to abrasive grains and the object, but also because the compound C contained in the polishing composition of the third embodiment chemically polishes the object.

The first to third embodiments may be modified as follows.

The polishing composition of the first embodiment may contain the compound B and the compound C. In this case, a further higher removal rate can be obtained by virtue of the functions of the compound B and the compound C.

The polishing compositions of the first to third embodiments each may contain not less than two compounds A.

The polishing composition of the second embodiment may contain not less than two compounds B.

The polishing composition of the third embodiment may contain not less than two compounds C.

The polishing compositions of the first to third embodiments each may contain not less than two abrasive grains.

The polishing compositions of the first to third embodiments each may contain a defoaming agent such as a silicone based defoaming agent, ether based defoaming agent, and alcohol based defoaming agent, if necessary. The defoaming agent to be added to a polishing composition preferably has a strong defoaming function for suppressing the polishing composition from foaming up and a strong foam-breaking function for destroying the foams already generated. The content of a defoaming agent in a polishing composition is preferably not more than 1% by mass, and more preferably, not more than 0.1% by mass.

The polishing compositions of the first to third embodiments each may contain colloidal particles such as colloidal silica or cellulose such as hydroxyethyl cellulose, if necessary.

The polishing compositions of the first to third embodiments each may be prepared by diluting a stock solution of a polishing composition at the time of use. This is advantageous in view of storage and transportation. The preferable ranges of the compounds A to C and abrasive grains in the polishing compositions of the first to third embodiments that are described above refer to those in the polishing compositions at the time to use.

Examples and Comparative Examples with respect to the first to third embodiments will be explained, below.

Polishing compositions according to Examples 1 to 35 and Comparative Examples 1 to 10 were prepared by appropriately blending the compounds A, B and C and α-alumina in water and further adding 0.7% by mass of a silicone based defoaming agent thereto. The details of the compounds A to C and α-alumina contained in each of the polishing compositions are as shown in Tables 1 and 2.

Using each of the polishing compositions of Examples 1 to 35 and Comparative Examples 1 to 10, a plastic lens was polished under the polishing conditions shown in Table 3. The weight of plastic lens was measured before and after the polishing operation to obtain difference in weight. The results are shown in the "removal rate" column of Table 1.

Using each of the polishing compositions of Examples 1 to 35 and Comparative Examples 1 to 10, a plastic lens was polished under the polishing conditions shown in Table 3. Thereafter, the surface roughness (Ra) of the plastic lens was measured by a noncontact surface roughness measurer "MicroXAM" (manufactured by Phase Shift) equipped with an objective lens of 50 times magnification. Based on the measurement result, the surface roughness (Ra) of a plastic lens polished by each of the polishing compositions was evaluated. The results are shown in the "surface roughness" column of the Table 1. In the column, "1" indicates that the surface roughness (Ra) is less than 110 Å; and "2" indicates that the surface roughness (Ra) is 110 Å or more.

TABLE 1

| | Compound A | | Compound B | | Compound C | | α-alumina | | Removal rate [g/3 min.] | Surface roughness |
| --- | --- | --- | --- | --- | --- | --- | --- | --- | --- | --- |
| | Kind | Content [mass %] | Kind | Content [mass %] | Kind | Content [mass %] | Average size [μm] | Content [mass %] | | |
| Ex. 1 | A1 | 0.7 | — | 0 | — | 0 | 0.8 | 16 | 0.028 | 1 |
| Ex. 2 | A1 | 1 | — | 0 | — | 0 | 0.8 | 16 | 0.029 | 1 |
| Ex. 3 | A1 | 0.04 | — | 0 | — | 0 | 0.8 | 16 | 0.018 | 1 |
| Ex. 4 | A1 | 0.7 | — | 0 | — | 0 | 0.8 | 26 | 0.029 | 1 |
| Ex. 5 | A1 | 0.7 | — | 0 | — | 0 | 0.8 | 9 | 0.026 | 1 |
| Ex. 6 | A1 | 0.7 | B1 | 9 | — | 0 | 0.8 | 16 | 0.032 | 1 |
| Ex. 7 | A1 | 1 | B1 | 9 | — | 0 | 0.8 | 16 | 0.033 | 1 |
| Ex. 8 | A1 | 0.04 | B1 | 9 | — | 0 | 0.8 | 16 | 0.020 | 1 |
| Ex. 9 | A1 | 0.7 | B1 | 17 | — | 0 | 0.8 | 16 | 0.033 | 1 |
| Ex. 10 | A1 | 0.7 | B1 | 4 | — | 0 | 0.8 | 16 | 0.030 | 1 |
| Ex. 11 | A1 | 0.7 | B1 | 9 | — | 0 | 0.8 | 26 | 0.033 | 1 |
| Ex. 12 | A1 | 0.7 | B1 | 9 | — | 0 | 0.8 | 9 | 0.030 | 1 |
| Ex. 13 | A1 | 0.7 | B2 | 9 | — | 0 | 0.8 | 16 | 0.035 | 1 |
| Ex. 14 | A1 | 0.7 | B3 | 9 | — | 0 | 0.8 | 16 | 0.034 | 1 |
| Ex. 15 | A1 | 0.7 | B4 | 9 | — | 0 | 0.8 | 16 | 0.035 | 1 |
| Ex. 16 | A2 | 0.7 | B1 | 9 | — | 0 | 0.8 | 16 | 0.028 | 1 |
| Ex. 17 | A1 | 0.7 | B1 | 9 | — | 0 | 1.3 | 16 | 0.039 | 2 |
| Ex. 18 | A1 | 0.7 | — | 0 | C1 | 1.7 | 0.8 | 16 | 0.046 | 1 |
| Ex. 19 | A2 | 0.7 | — | 0 | C1 | 1.7 | 0.8 | 16 | 0.040 | 1 |
| Ex. 20 | A1 | 0.7 | — | 0 | C1 | 2.6 | 0.8 | 16 | 0.046 | 1 |
| Ex. 21 | A1 | 0.7 | — | 0 | C1 | 0.5 | 0.8 | 16 | 0.038 | 1 |
| Ex. 22 | A1 | 0.7 | — | 0 | C2 | 1.7 | 0.8 | 16 | 0.044 | 1 |
| Ex. 23 | A1 | 1 | — | 0 | C1 | 1.7 | 0.8 | 16 | 0.047 | 1 |
| Ex. 24 | A1 | 0.04 | — | 0 | C1 | 1.7 | 0.8 | 16 | 0.029 | 1 |
| Ex. 25 | A1 | 0.7 | — | 0 | C1 | 1.7 | 0.8 | 26 | 0.048 | 1 |
| Ex. 26 | A1 | 0.7 | — | 0 | C1 | 1.7 | 0.8 | 9 | 0.043 | 1 |
| Ex. 27 | A1 | 0.7 | B1 | 9 | C1 | 1.7 | 0.8 | 16 | 0.049 | 1 |
| Ex. 28 | A1 | 1 | B1 | 9 | C1 | 1.7 | 0.8 | 16 | 0.051 | 1 |
| Ex. 29 | A1 | 0.04 | B1 | 9 | C1 | 1.7 | 0.8 | 16 | 0.031 | 1 |
| Ex. 30 | A1 | 0.7 | B1 | 17 | C1 | 1.7 | 0.8 | 16 | 0.051 | 1 |

TABLE 1-continued

| | Compound A | | Compound B | | Compound C | | α-alumina | | Removal rate [g/3 min.] | Surface roughness |
|---|---|---|---|---|---|---|---|---|---|---|
| | Kind | Content [mass %] | Kind | Content [mass %] | Kind | Content [mass %] | Average size [μm] | Content [mass %] | | |
| Ex. 31 | A1 | 0.7 | B1 | 4 | C1 | 1.7 | 0.8 | 16 | 0.045 | 1 |
| Ex. 32 | A1 | 0.7 | B1 | 9 | C1 | 2.6 | 0.8 | 16 | 0.049 | 1 |
| Ex. 33 | A1 | 0.7 | B1 | 9 | C1 | 0.5 | 0.8 | 16 | 0.041 | 1 |
| Ex. 34 | A1 | 0.7 | B1 | 9 | C1 | 1.7 | 0.8 | 26 | 0.051 | 1 |
| Ex. 35 | A1 | 0.7 | B1 | 9 | C1 | 1.7 | 0.8 | 9 | 0.043 | 1 |

TABLE 2

| | Compound A | | Compound B | | Compound C | | α-alumina | | Removal rate [g/3 min.] | Surface roughness |
|---|---|---|---|---|---|---|---|---|---|---|
| | Kind | Content [mass %] | Kind | Content [mass %] | Kind | Content [mass %] | Average size [μm] | Content [mass %] | | |
| C. Ex. 1 | — | 0 | B1 | 9 | C1 | 1.7 | 0.8 | 16 | 0.022 | 1 |
| C. Ex. 2 | — | 0 | B2 | 9 | C1 | 1.7 | 0.8 | 16 | 0.030 | 1 |
| C. Ex. 3 | — | 0 | B3 | 7 | C1 | 1.7 | 0.8 | 16 | 0.028 | 1 |
| C. Ex. 4 | — | 0 | B4 | 7 | C1 | 1.7 | 0.8 | 16 | 0.029 | 1 |
| C. Ex. 5 | — | 0 | B1 | 9 | — | 0 | 0.8 | 16 | 0.015 | 1 |
| C. Ex. 6 | — | 0 | B2 | 9 | — | 0 | 0.8 | 16 | 0.020 | 1 |
| C. Ex. 7 | — | 0 | B3 | 7 | — | 0 | 0.8 | 16 | 0.019 | 1 |
| C. Ex. 8 | — | 0 | B4 | 7 | — | 0 | 0.8 | 16 | 0.020 | 1 |
| C. Ex. 9 | — | 0 | — | 0 | C1 | 1.7 | 0.8 | 16 | 0.016 | 1 |
| C. Ex. 10 | — | 0 | — | 0 | C2 | 1.7 | 0.8 | 16 | 0.015 | 1 |

TABLE 3

| | |
|---|---|
| Object to be polished: | plastic lens of 70 mm diameter formed of diethylene glycol bisallyl carbonate (CR-39) |
| Polishing machine: | lens polisher "TORO-X-2000" manufactured by LOH |
| Polishing pad: | "CPR0400M" manufactured by DAC vision |
| Convex polishing plate: | 5.00-6.00 diopter |
| Polishing load: | 40 kPa (=0.4 bar) |
| Polishing time: | 3 minutes |
| Amount of polishing composition in use: | 1.0 liter (recycle use) |
| Supply rate of polishing composition: | 1.2 liter/minute |
| Temperature of polishing composition: | 10° C. |

In the "compound A" column of each of Tables 1 and 2, A1 denotes a compound represented by the general formula (1) and having an average molecular weight of 10,000 and a viscosity of 30,000 cps, and A2 denotes a compound represented by the general formula (1) and having an average molecular weight of 8,000 and a viscosity of 6,000 cps. The viscosity of the compound A is represented by that of an aqueous solution of the compound A (30% by mass) measured at 25° C. by a BH type rotary viscometer. In the "compound B" column of each of Tables 1 and 2, B1 denotes propylene glycol; B2 poly(oxyethylene-oxypropylene)glyceryl ether (an average molecular weight: about 2,800); B3 a polyoxyalkylene monobutyl ether (an average molecular weight: about 2,300); and B4 a polyoxyalkylene monobutyl ether (an average molecular weight: about 3,750). In the "compound C" column of each of Tables 1 and 2, C1 denotes aluminum nitrate; and C2 aluminum chloride. The average size of α-alumina grains contained in each of the polishing compositions, which size is shown in the "α-alumina" column of Tables 1 and 2, was determined by the Coulter Counter method.

As shown in Tables 1 and 2, in the polishing compositions of Examples 1 to 35, the results of removal rate and surface roughness were satisfactory from a practical point of view. Also in Comparative Examples 1 to 10, the removal rate and surface roughness were almost satisfactory in practice; however, BOD and COD were high despite of the removal rates (which are not so high).

A fourth embodiment will be explained below.

A polishing composition according to the fourth embodiment, which is produced by blending the compound A and abrasive grains in water so as to obtain a pH of 3 to 8, substantially consists of the compound A, abrasive grains, and water. That is, a polishing composition according to the fourth embodiment differs from that of the first embodiment in the pH of 3 to 8. The polishing composition of the fourth embodiment is also used in polishing an object formed of a synthetic resin such as a plastic lens.

The pH of a polishing composition according to the fourth embodiment is 3 to 8. When the pH of the polishing composition is lower than 3, a polishing machine is easily eroded. When the pH of the polishing composition is higher than 8, the performance of the polishing composition for polishing an object formed of a synthetic resin is insufficient and the re-dispersibility of the polishing composition tends to decrease. A polishing composition according to the fourth embodiment, since it has the pH of 3 to 8, can suitably polish an object formed of a synthetic resin without eroding the polishing machine. However, as the pH of a polishing composition according to the fourth embodiment decreases even if its pH is within the range of 3 to 8, the polishing machine tends to be eroded. To prevent the erosion of the polishing machine without fail, the pH of the polishing composition of the fourth embodiment is preferably 5 or more. Furthermore, to obtain particularly satisfactory re-dispersibility, the pH of the polishing composition of the fourth embodiment is preferably 7 or less.

According to the fourth embodiment, the following advantages are obtained in addition to those of the first embodiment.

Since a polishing composition according to the fourth embodiment has a pH of 3 to 8, an object formed of a synthetic resin can be suitably polished without eroding a polishing machine.

A fifth embodiment of the present invention will be explained below.

A polishing composition according to the fifth embodiment, which is produced by blending the compound A, the compound B and abrasive grains in water so as to obtain a pH of 3 to 8, substantially consists of the compounds A and B, abrasive grains, and water. That is, a polishing composition according to the fifth embodiment differs from that of the second embodiment in the pH of 3 to 8. The polishing composition of the fifth embodiment is also used in polishing an object formed of a synthetic resin such as a plastic lens.

The pH of a polishing composition according to the firth embodiment must be 3 to 8 in order to suitably polish an object formed of a synthetic resin in the same as in a polishing composition according to the fourth embodiment. The pH of a polishing composition according to the fifth embodiment is preferably 5 or more in order to present erosion of a polishing machine without fail. To obtain particularly satisfactory re-dispersibility, the pH of a polishing composition according to the fifth embodiment is preferably 7 or less.

According to the fifth embodiment, the following advantages are obtained in addition to those of the second embodiment.

Since the polishing composition of the fifth embodiment has a pH of 3 to 8, an object formed of a synthetic resin can be suitably polished without eroding a polishing machine.

The fourth and fifth embodiments may be modified as follows.

The polishing compositions of the fourth and fifth embodiments each may contain not less than two compounds A.

The polishing composition of the fifth embodiment may contain not less than two compounds B.

The polishing compositions of the fourth and fifth embodiments each may contain not less than two abrasive grains.

The polishing compositions of the fourth and fifth embodiments each do not need to contain abrasive grains. Even in this case, the performance of the polishing composition for polishing an object formed of a synthetic resin can be ensured by virtue of the functions of the compounds A and B. However, to obtain a higher removal rate, the polishing compositions of the fourth and fifth embodiments each preferably contain abrasive grains.

The polishing compositions of the fourth and fifth embodiments each may contain a pH adjuster such as an inorganic acid, organic acid, metal salt of an inorganic acid, or metal salt of an organic acid, if necessary. The inorganic acid may be any one of nitric acid, sulfuric acid, and hydrochloric acid. The organic acid may be any one of oxalic acid, lactic acid, acetic acid, formic acid, citric acid, tartaric acid, malic acid, gluconic acid, glycolic acid, and malonic acid. The metal salt may be any one of an aluminum salt, nickel salt, lithium salt, magnesium salt, sodium salt, and potassium salt. Even if a pH adjuster is added, the pH of each of the polishing compositions of the fourth and fifth embodiments must be 3 to 8.

The polishing compositions of the fourth and fifth embodiments each may contain a defoaming agent such as a silicone based defoaming agent, ether based defoaming agent, and alcohol based defoaming agent, if necessary. The defoaming agent to be added to a polishing composition preferably has a strong defoaming function for suppressing the polishing composition from foaming up and a strong foam-breaking function for destroying the foams already generated. The content of a defoaming agent in a polishing composition is preferably not more than 1% by mass, and more preferably, not more than 0.1% by mass.

The polishing compositions of the fourth and fifth embodiments each may contain colloidal particles such as colloidal silica or cellulose such as hydroxyethyl cellulose, if necessary.

The polishing compositions of the fourth and fifth embodiments each may be prepared by diluting a stock solution of a polishing composition at the time of use. This is advantageous in view of storage and transportation. The preferable ranges of the compounds A, B and abrasive grains in the polishing compositions of the fourth and fifth embodiments that are described above refer to those in the polishing compositions at the time to use.

Examples and Comparative Examples with respect to the fourth and fifth embodiments will be explained below.

Polishing compositions according to Examples 101 to 117 and Comparative Examples 101 to 107 were prepared by appropriately blending the compounds A, B, α-alumina and a silicone based defoaming agent in water and further adding a pH adjuster, if necessary, to obtain a desired pH value. The details of the compounds A and B, α-alumina and pH adjuster contained in each of the polishing compositions as well as the pH of each of the polishing compositions are as shown in Table 4. The content of the silicone based defoaming agent in each of the polishing compositions is 0.7% by mass.

Using each of the polishing compositions of Examples 101 to 117 and Comparative Examples 101 to 107, a plastic lens was polished under the polishing conditions shown in Table 5. The weight of plastic lens was measured before and after the polishing operation to obtain difference in weight. The results are shown in the "removal rate" column of Table 4.

Each (200 cc) of the polishing compositions of Examples 101 to 117 and Comparative Examples 101 to 107 was placed in a beaker and a brass board (2 cm length×2 cm width×0.5 mm thickness) was placed therein, and then allowed to stand still for 48 hours. Thereafter, the brass board was taken out and washed with water. The presence or absence of erosion in the surface of the brass board was visually observed. Based on the visual observation, the erosion level of each of the polishing compositions was evaluated. The results are shown in the "erosion" column of Table 4. In the column, "1" indicates that neither cloudy portion nor blackening due to erosion were observed; "2" indicates that a cloudy portion was observed but no blackening was observed; and "3" indicates that blackening was observed.

Each (500 cc) of the polishing compositions of Examples 101 to 117 and Comparative Examples 101 to 107 was placed in a polymer container (1 L) and allowed to stand still for one month. Thereafter, the polymer container was gradually pushed sideways. Then, the time required for abrasive grains to start moving from the bottom of the polymer container was measured. Based on the results, the re-dispersibility of each of the polishing compositions was evaluated. The evaluation results of re-dispersibility are shown in the "re-dispersibility" column of Table 4. In the column, "1" indicates that abrasive grains started moving within 10 seconds; "2" indicates that abrasive grains started moving from 10 seconds (not inclusive) to 30 seconds (inclusive); and "3" indicates that abrasive grains started moving after 30 seconds.

TABLE 4

| | Compound A | | Compound B | | α-alumina | | pH adjuster | | Removal rate | | |
|---|---|---|---|---|---|---|---|---|---|---|---|
| | Kind | Content [mass %] | Kind | Content [mass %] | Average size [μm] | Content [mass %] | Kind | pH | [g/3 min.] | Erosion | Re-dispersibility |
| Ex. 101 | A1 | 0.7 | — | 0 | 0.8 | 16 | — | 6.2 | 0.028 | 1 | 1 |
| Ex. 102 | A1 | 0.7 | B1 | 9 | 0.8 | 16 | — | 6.2 | 0.032 | 1 | 1 |
| Ex. 103 | A1 | 0.7 | B2 | 9 | 0.8 | 16 | — | 5.6 | 0.035 | 1 | 1 |
| Ex. 104 | A1 | 0.7 | B3 | 9 | 0.8 | 16 | — | 5.6 | 0.034 | 1 | 1 |
| Ex. 105 | A1 | 0.7 | B4 | 9 | 0.8 | 16 | — | 5.6 | 0.035 | 1 | 1 |
| Ex. 106 | A2 | 0.7 | B1 | 9 | 0.8 | 16 | — | 6.2 | 0.028 | 1 | 1 |
| Ex. 107 | A1 | 0.7 | — | 0 | 0.8 | 16 | C1 | 3.5 | 0.046 | 2 | 1 |
| Ex. 108 | A1 | 0.7 | — | 0 | 0.8 | 16 | C2 | 3.5 | 0.044 | 2 | 1 |
| Ex. 109 | A1 | 0.7 | — | 0 | 0.8 | 16 | C3 | 7.5 | 0.027 | 1 | 1 |
| Ex. 110 | A1 | 0.7 | — | 0 | 0.8 | 16 | C4 | 7.5 | 0.024 | 1 | 2 |
| Ex. 111 | A1 | 0.7 | B1 | 9 | 0.8 | 16 | C1 | 3.5 | 0.049 | 2 | 1 |
| Ex. 112 | A1 | 0.7 | B2 | 9 | 0.8 | 16 | C1 | 3.5 | 0.052 | 2 | 1 |
| Ex. 113 | A1 | 0.7 | B2 | 9 | 0.8 | 16 | C3 | 7.5 | 0.034 | 1 | 2 |
| Ex. 114 | A1 | 0.7 | B3 | 9 | 0.8 | 16 | C1 | 3.5 | 0.050 | 2 | 1 |
| Ex. 115 | A1 | 0.7 | B4 | 9 | 0.8 | 16 | C1 | 3.5 | 0.051 | 2 | 1 |
| Ex. 116 | A1 | 0.7 | B4 | 9 | 0.8 | 16 | C3 | 7.5 | 0.033 | 1 | 2 |
| Ex. 117 | A2 | 0.7 | B1 | 9 | 0.8 | 16 | C1 | 3.5 | 0.047 | 2 | 1 |
| C. Ex. 101 | A1 | 0.7 | — | 0 | 0.8 | 16 | C5 | 2.5 | 0.043 | 3 | 1 |
| C. Ex. 102 | A1 | 0.7 | — | 0 | 0.8 | 16 | C6 | 2.5 | 0.041 | 3 | 1 |
| C. Ex. 103 | A1 | 0.7 | — | 0 | 0.8 | 16 | C3 | 8.5 | 0.013 | 1 | 3 |
| C. Ex. 104 | A1 | 0.7 | B1 | 9 | 0.8 | 16 | C5 | 2.5 | 0.048 | 3 | 1 |
| C. Ex. 105 | A1 | 0.7 | B2 | 9 | 0.8 | 16 | C3 | 8.5 | 0.019 | 1 | 3 |
| C. Ex. 106 | A1 | 0.7 | B3 | 9 | 0.8 | 16 | C5 | 2.5 | 0.047 | 3 | 1 |
| C. Ex. 107 | A2 | 0.7 | B1 | 9 | 0.8 | 16 | C5 | 2.5 | 0.045 | 3 | 1 |

TABLE 5

| | |
|---|---|
| Object to be polished: | plastic lens of 70 mm diameter formed of diethylene glycol bisallyl carbonate (CR-39) |
| Polishing machine: | lens polisher "TORO-X-2000" manufactured by LOH |
| Polishing pad: | "CPR0400M" manufactured by DAC vision |
| Convex polishing plate: | 5.00-6.00 diopter |
| Polishing load: | 40 kPa (=0.4 bar) |
| Polishing time: | 3 minutes |
| Amount of polishing composition in use: | 1.0 liter (recycle use) |
| Supply rate of polishing composition: | 1.2 liter/minute |
| Temperature of polishing composition: | 10° C. |

In the "compound A" column of Table 4, A1 denotes a compound represented by the general formula (1) and having an average molecular weight of 10,000 and a viscosity of 30,000 cps and A2 denotes a compound represented by the general formula (1) and having an average molecular weight of 8,000 and a viscosity of 6,000 cps. The viscosity of compound A is represented by that of an aqueous solution of the compound A (30% by mass) measured at 25° C. by a BH type rotary viscometer. In the "compound B" column of Table 4, B1 denotes propylene glycol; B2 poly(oxyethylene-oxypropylene)glyceryl ether (an average molecular weight: about 2,800); B3 a polyoxyalkylene monobutyl ether (an average molecular weight: about 2,300); and B4 a polyoxyalkylene monobutyl ether (an average molecular weight: about 3,750). In the "pH adjuster" column of Table 4, C1 denotes aluminum nitrate; C2 aluminum chloride; C3 potassium hydroxide; C4 denotes sodium hydroxide; C5 denotes nitric acid; and C6 denotes hydrochloric acid. The average size of α-alumina grains contained in each of the polishing compositions, which size is shown in the "α-alumina" column of Table 4, was determined by the Coulter Counter method.

As shown in Table 4, in each of the polishing compositions of Examples 101 to 117, the results of removal rate, erosion and re-dispersibility were satisfactory from a practical point of view. In contrast, in the polishing compositions of Comparative Examples 101, 102, 104, 106 and 107 having a pH of less than 3, satisfactory results were not obtained with respect to erosion. Furthermore, in the polishing compositions of Comparative Examples 103 and 105 having a pH of larger than 8, the removal rate and re-dispersibility were not satisfactory from a practical point of view.

Now, a sixth embodiment will be explained below.

A polishing composition according to the sixth embodiment, which is produced by blending the compound A and abrasive grains in water so as to obtain a viscosity of 3 to 9 mPa·s, substantially consists of the compound A, abrasive grains, and water. That is, a polishing composition according to the sixth embodiment differs from that of the first embodiment in the viscosity of 3 to 9 mPa·s. The polishing composition of the sixth embodiment is also used in polishing an object formed of a synthetic resin such as a plastic lens.

The viscosity of a polishing composition according to the sixth embodiment is 3 to 9 mPa·s. When the viscosity of a polishing composition is lower than 3 mPa·s, a sufficient removal rate cannot be obtained and the polishing performance of the polishing composition decreases as it is repeatedly used in a polishing operation. In addition, it becomes difficult for a polishing pad to hold abrasive grains during polishing operation. As a result, a high removal rate cannot be obtained and defects such as scratch may be produced in the surface of an object after polishing. On the other hand, when the viscosity of a polishing composition is higher than 9 mPa·s, the polishing composition is likely to adhere to the object after polishing. As a result, it may take time to wash the object. Furthermore, the amount of the polishing composition (abrasive grains) adhering to the object and taken away from the polishing system increases. Therefore, the polishing composition must be frequently replenished or exchanged in order to keep a constant concentration of the abrasive grains particularly when the polishing composition is repeatedly used.

The sixth embodiment has the following advantages in addition to those of the first embodiment.

Since a polishing composition according to the sixth embodiment has a viscosity of 3 to 9 mPa·s, the amount and performance of the polishing composition rarely decrease even if the polishing composition is repeatedly used. Therefore, the polishing composition of the sixth embodiment can be suitably used in polishing an object formed of a synthetic resin.

A seventh embodiment will be explained below.

A polishing composition according to the seventh embodiment, which is produced by blending the compound A, the compound C and abrasive grains in water so as to obtain a viscosity of 3 to 9 mPa·s, substantially consists of the compounds A and C, abrasive grains, and water. That is, a polishing composition according to the seventh embodiment differs from that of the third embodiment in the viscosity of 3 to 9 mPa·s. The polishing composition of the seventh embodiment is also used in polishing an object formed of a synthetic resin such as a plastic lens.

The seventh embodiment has the following advantages in addition to those of the third embodiment.

Since a polishing composition according to the seventh embodiment has a viscosity of 3 to 9 mPa·s, the amount and performance of the polishing composition rarely decrease even if the composition is repeatedly used as in the polishing composition of the sixth embodiment. Therefore, the polishing composition of the seventh embodiment can be suitably used in polishing an object formed of a synthetic resin.

The sixth and seventh embodiments may be modified as follows.

The polishing compositions of the sixth and seventh embodiments each may contain not less than two compounds A.

The polishing composition of the seventh embodiment may contain not less than two compounds C.

The polishing compositions of the sixth and seventh embodiments each may contain not less than two abrasive grains.

The polishing compositions of the sixth and seventh embodiments each do not need to contain abrasive grains. Even in this case, the performance of the polishing composition for polishing an object formed of a synthetic resin can be ensured by virtue of the functions of the compounds A and C. However, to obtain a higher removal rate, the polishing compositions of the sixth and seventh embodiments each preferably contain abrasive grains.

The polishing compositions of the sixth and seventh embodiments each may contain a thickening agent, if necessary. Addition of the thickening agent to a polishing composition appropriately increases the viscosity, thereby improving the stability of the polishing composition and the removal rate thereof. More specifically, as the thickening agent to be added to a polishing composition, mention may be made of a compound obtained by reacting a polyalkylene oxide with a methane hydrocarbon, glycerin, 1,2,3-trimethoxypropane, diethyl ether or methyl acetate, and a polyalkylene oxide such as propylene glycol. The polyalkylene oxide can mediate a dealkylation reaction or dealcohol reaction with a methane hydrocarbon, glycerin, 1,2,3-trimethoxypropane, diethyl ether, and methyl acetate. Examples of the compound obtained by reacting a polyalkylene oxide with a methane hydrocarbon or the like include poly(oxyethylene-oxypropylene)glyceryl ether and a polyoxyalkylene monobutyl ether. Even if a thickening agent is added, the viscosity of each of the polishing compositions of the sixth and seventh embodiments must be 3 to 9 mPa·s.

The polishing compositions of the sixth and seventh embodiments each may contain a defoaming agent such as a silicone based defoaming agent, ether based defoaming agent, and alcohol based defoaming agent, if necessary. The defoaming agent to be added to a polishing composition preferably has a strong defoaming function for suppressing the polishing composition from foaming up and a strong foam-breaking function for destroying the foams already generated. The content of a defoaming agent in a polishing composition is preferably not more than 1% by mass, and more preferably, not more than 0.1% by mass.

The polishing compositions of the sixth and seventh embodiments each may contain colloidal particles such as colloidal silica or cellulose such as hydroxyethyl cellulose, if necessary.

The polishing compositions of the sixth and seventh embodiments each may be prepared by diluting a stock solution of a polishing composition at the time of use. This is advantageous in view of storage and transportation. The preferable ranges of the compounds A and C and abrasive grains in each of the polishing compositions that are described above refer to those in the polishing compositions at the time to use.

Examples and Comparative Examples with respect to the sixth and seventh embodiments will be explained, below.

Polishing compositions according to Examples 201 to 215 and Comparative Examples 201 to 205 were prepared by appropriately blending the compounds A, C, α-alumina grains and a silicone based defoaming agent in water, and further adding a thickening agent thereto, if necessary, so as to obtain a desired viscosity value. The details of the compounds A and C, α-alumina grains and the viscosity of each of the polishing compositions are as shown in Table 6. The content of the silicone based defoaming agent in each of the polishing compositions is 0.7% by mass.

Using each of the polishing compositions of Examples 201 to 215 and Comparative Examples 201 to 205, a plastic lens was polished under the polishing conditions shown in Table 7. The weight of plastic lens was measured before and after the polishing operation to obtain difference in weight. The results are shown in the "removal rate" column of Table 6.

The polishing compositions of Examples 201 to 215 and Comparative Examples 201 to 205 each was repeatedly used 50 times for polishing a plastic lens under the polishing conditions shown in Table 7. After the 50th polishing operation, the polishing composition was collected to measure the amount of the polishing composition to determine a quantitative reduction rate. Based on the results, each of the polishing compositions was evaluated for the quantitative reduction rate along with the repeated use. The results are shown in the "quantitative reduction rate" column of Table 6. In the column, "1" indicates that the quantitative reduction rate of a polishing composition is less than 20%; "2" indicates that the quantitative reduction rate of a polishing composition is from 20% (inclusive) to 30% (not inclusive); and "3" indicates that the quantitative reduction rate of a polishing composition is 30% or more.

The polishing compositions of Examples 201 to 215 and Comparative Examples 201 to 205 each was repeatedly used 50 times for polishing a plastic lens under the polishing conditions shown in Table 7. The removal rate of the 50th polishing operation is divided by that of the first polishing operation to obtain a removal-rate retention rate. Based on the results of removal-rate retention rate, each of the polishing composition was evaluated for deterioration of polishing performance. The results are shown in the "removal-rate retention rate" column of Table 6. In the column, "1" indicates that a removal-rate retention rate is 90% or more; "2" indicates that a removal-rate retention rate is from 90% (not inclusive) to 85% (inclusive); and "3" indicates that a removal-rate retention rate is less than 85%.

TABLE 6

| | Compound A | | Compound C | | α-alumina | | Thickening agent Kind | Viscosity [mPa·s] | Removal rate [g/3 min.] | Quantitative reduction rate | Removal-rate retention rate |
| --- | --- | --- | --- | --- | --- | --- | --- | --- | --- | --- | --- |
| | Kind | Content [mass %] | Kind | Content [mass %] | Average size [μm] | Content [mass %] | | | | | |
| Ex. 201 | A1 | 0.7 | — | 0 | 0.8 | 16 | — | 3.4 | 0.028 | 1 | 2 |
| Ex. 202 | A1 | 0.7 | C1 | 1.7 | 0.8 | 16 | — | 3.8 | 0.046 | 1 | 1 |
| Ex. 203 | A2 | 0.7 | C1 | 1.7 | 0.8 | 16 | — | 3 | 0.040 | 1 | 2 |
| Ex. 204 | A1 | 0.7 | C2 | 1.7 | 0.8 | 16 | — | 3.8 | 0.044 | 1 | 1 |
| Ex. 205 | A1 | 0.7 | — | 0 | 0.8 | 16 | B1 | 5 | 0.032 | 1 | 1 |
| Ex. 206 | A1 | 0.7 | — | 0 | 0.8 | 16 | B1 | 7 | 0.033 | 2 | 2 |
| Ex. 207 | A2 | 0.7 | — | 0 | 0.8 | 16 | B2 | 7 | 0.035 | 2 | 2 |
| Ex. 208 | A1 | 0.7 | — | 0 | 0.8 | 16 | B3 | 7 | 0.034 | 2 | 2 |
| Ex. 209 | A1 | 0.7 | — | 0 | 0.8 | 16 | B4 | 7 | 0.035 | 2 | 2 |
| Ex. 210 | A1 | 0.7 | C1 | 1.7 | 0.8 | 16 | B1 | 7 | 0.051 | 2 | 2 |
| Ex. 211 | A1 | 0.7 | C1 | 1.7 | 0.8 | 16 | B2 | 7 | 0.053 | 2 | 2 |
| Ex. 212 | A1 | 0.7 | C1 | 1.7 | 0.8 | 16 | B3 | 7 | 0.054 | 2 | 2 |
| Ex. 213 | A1 | 0.7 | C1 | 1.7 | 0.8 | 16 | B4 | 7 | 0.052 | 2 | 2 |
| Ex. 214 | A2 | 0.7 | C1 | 1.7 | 0.8 | 16 | B1 | 7 | 0.049 | 2 | 2 |
| Ex. 215 | A1 | 0.7 | C2 | 1.7 | 0.8 | 16 | B1 | 5 | 0.047 | 1 | 1 |
| C. Ex. 201 | A1 | 0.7 | — | 0 | 0.8 | 16 | B2 | 9.5 | 0.034 | 3 | 2 |
| C. Ex. 202 | A1 | 0.7 | — | 0 | 0.8 | 16 | B3 | 9.5 | 0.035 | 3 | 2 |
| C. Ex. 203 | A1 | 0.7 | C1 | 1.7 | 0.8 | 16 | B1 | 9.5 | 0.050 | 3 | 2 |
| C. Ex. 204 | A1 | 0.7 | C1 | 1.7 | 0.8 | 16 | B2 | 9.5 | 0.052 | 3 | 2 |
| C. Ex. 205 | A1 | 0.7 | C2 | 1.7 | 0.8 | 16 | B3 | 9.5 | 0.054 | 3 | 2 |

TABLE 7

| | |
| --- | --- |
| Object to be polished: | plastic lens of 70 mm diameter formed of diethylene glycol bisallyl carbonate (CR-39) |
| Polishing machine: | lens polisher "TORO-X-2000" manufactured by LOH |
| Polishing pad: | "CPR0400M" manufactured by DAC vision |
| Convex polishing plate: | 5.00-6.00 diopter |
| Polishing load: | 40 kPa (=0.4 bar) |
| Polishing time: | 3 minutes |
| Amount of polishing composition in use: | 1.0 liter (recycle use) |
| Supply rate of polishing composition: | 1.2 liter/minute |
| Temperature of polishing composition: | 10° C. |

In the "compound A" column of Table 6, A1 denotes a compound represented by the general formula (1) and having an average molecular weight of 10,000 and a viscosity of 30,000 cps and A2 denotes a compound represented by the general formula (1) and having an average molecular weight of 8,000 and a viscosity of 6,000 cps. The viscosity of the compound A is represented by that of an aqueous solution of the compound A (30% by mass) measured at 25° C. by a BH type rotary viscometer. In the "compound C" column of Table 6, C1 denotes aluminum nitrate; and C2 denotes aluminum chloride. In the "thickening agent" column of Table 6, B1 denotes propylene glycol; B2 poly(oxyethylene-oxypropylene)glyceryl ether (an average molecular weight: about 2,800); B3 a polyoxyalkylene monobutyl ether (an average molecular weight: about 2,300); and B4 a polyoxyalkylene monobutyl ether (an average molecular weight: about 3,750). The average size of α-alumina grains contained in each of the polishing compositions, which size is shown in the "α-alumina" column of Table 6, was determined by the Coulter Counter method.

As shown in Table 6, in each of the polishing compositions of Examples 201 to 215, the removal rate, quantitative reduction rate and removal-rate retention rate were satisfactory from a practical point of view. In contrast, in the polishing compositions of Comparative Examples 201 to 205 having a viscosity of more than 9 mPa·s, the quantitative reduction rate was not satisfactory in a practical point of view.

The invention claimed is:

1. A polishing composition for use in polishing an object formed of a synthetic resin, the composition comprising:
   a compound represented by the general formula (1)

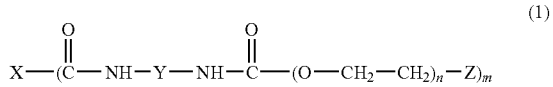

(1)

where X represents a residue of polyether polyol (having a polyether chain containing an oxyethylene group in an amount of 20 to 90% by mass) derived from a compound having an active hydrogen atom and an alkylene oxide; m represents an integer of 2 to 8, which is equal to the number of hydroxy groups contained in a single polyether polyol molecule; Y and Z represent a lower alcohol residue to which ethylene oxide or propylene oxide is added by addition polymerization, an alkyl group or an alkylene group, respectively; and n is an integer of 3 or more; and
   abrasive grains.

2. The polishing composition according to claim 1, further comprising at least one compound selected from the group consisting of a compound obtained by reacting a polyalkylene oxide with a methane hydrocarbon, glycerin, 1,2,3-trimethoxypropane, diethyl ether, or methyl acetate, and polyalkylene oxide.

3. The polishing composition according to claim 2, wherein the polyalkylene oxide to be reacted with a methane hydrocarbon, glycerin, 1,2,3-trimethoxypropane, diethyl ether, or methyl acetate is polyethylene oxide, polypropylene oxide, or a copolymer of ethylene oxide with propylene oxide.

4. The polishing composition according to claim 1, further comprising at least one compound selected from the group consisting of a metal salt of an inorganic acid, a metal salt of an organic acid, an ammonium salt of an inorganic acid, and an ammonium salt of an organic acid.

5. The polishing composition according to claim 2, further comprising at least one compound selected from the group consisting of a metal salt of an inorganic acid, a metal salt of an organic acid, an ammonium salt of an inorganic acid, and an ammonium salt of an organic acid.

6. The polishing composition according to claim 1, wherein the abrasive grains contain alumina.

7. The polishing composition according to claim 6, wherein the abrasive grains contain α-alumina.

8. A polishing composition for use in polishing an object formed of a synthetic resin, the composition comprising a compound represented by the general formula (1)

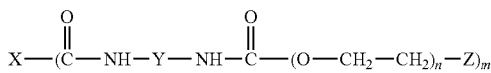   (1)

where X represents a residue of polyether polyol (having a polyether chain containing an oxyethylene group in an amount of 20 to 90% by mass) derived from a compound having an active hydrogen atom and an alkylene oxide; m represents an integer of 2 to 8, which is equal to the number of hydroxy groups contained in a single polyether polyol molecule; Y and Z represent a lower alcohol residue to which ethylene oxide or propylene oxide is added by addition polymerization, an alkyl group or an alkylene group, respectively; and n is an integer of 3 or more, wherein the composition has a pH of 3 to 8.

9. The polishing composition according to claim 8, wherein the pH is 5 to 7.

10. The polishing composition according to claim 8, further comprising at least one compound selected from the group consisting of a compound obtained by reacting a polyalkylene oxide with a methane hydrocarbon, glycerin, 1,2,3-trimethoxypropane, diethyl ether, or methyl acetate, and polyalkylene oxide.

11. The polishing composition according to claim 10, wherein the polyalkylene oxide to be reacted with a methane hydrocarbon, glycerin, 1,2,3-trimethoxypropane, diethyl ether, or methyl acetate is polyethylene oxide, polypropylene oxide, or a copolymer of ethylene oxide with propylene oxide.

12. The polishing composition according to claim 8, further comprising abrasive grains.

13. The polishing composition according to claim 12, wherein the abrasive grains contain alumina.

14. The polishing composition according to claim 13, wherein the abrasive grains contain α-alumina.

15. The polishing composition according to claim 10, further comprising abrasive grains.

16. A polishing composition for use in polishing an object formed of a synthetic resin, the composition comprising a compound represented by the general formula (1)

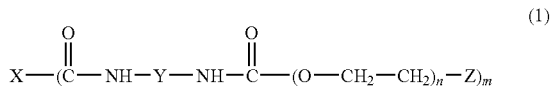   (1)

where X represents a residue of polyether polyol (having a polyether chain containing an oxyethylene group in an amount of 20 to 90% by mass) derived from a compound having an active hydrogen atom and an alkylene oxide; m represents an integer of 2 to 8, which is equal to the number of hydroxy groups contained in a single polyether polyol molecule; Y and Z represent a lower alcohol residue to which ethylene oxide or propylene oxide is added by addition polymerization, an alkyl group or an alkylene group, respectively; and n is an integer of 3 or more, wherein the composition has a viscosity of 3 to 9 mPa·s.

17. The polishing composition according to claim 16, further comprising at least one compound selected from the group consisting of a metal salt of an inorganic acid, a metal salt of an organic acid, an ammonium salt of an inorganic acid, and an ammonium salt of an organic acid.

18. The polishing composition according to claim 16, further comprising abrasive grains.

19. The polishing composition according to claim 18, wherein the abrasive grains contain alumina.

20. The polishing composition according to claim 19, wherein the abrasive grains contain α-alumina.

21. The polishing composition according to claim 17, further comprising abrasive grains.

* * * * *

UNITED STATES PATENT AND TRADEMARK OFFICE
CERTIFICATE OF CORRECTION

PATENT NO.      : 7,655,057 B2                                      Page 1 of 1
APPLICATION NO. : 11/512997
DATED           : February 2, 2010
INVENTOR(S)     : Eiichi Yamada It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 778 days.

Signed and Sealed this

Twenty-third Day of November, 2010

David J. Kappos
*Director of the United States Patent and Trademark Office*